United States Patent
Liu

(10) Patent No.: US 11,563,676 B2
(45) Date of Patent: Jan. 24, 2023

(54) METHOD AND APPARATUS FOR UNIVERSAL INTEGRATED CIRCUIT CARD UPDATE VIA DEDICATED NETWORK FUNCTION

(71) Applicant: Nokia Technologies Oy, Espoo (FI)

(72) Inventor: Jennifer J-N Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 145 days.

(21) Appl. No.: 16/991,600

(22) Filed: Aug. 12, 2020

(65) Prior Publication Data

US 2021/0051098 A1 Feb. 18, 2021

Related U.S. Application Data

(60) Provisional application No. 62/888,268, filed on Aug. 16, 2019.

(51) Int. Cl.
*H04W 4/00* (2018.01)
*H04L 45/00* (2022.01)
*H04L 41/082* (2022.01)
*G06F 8/65* (2018.01)
(Continued)

(52) U.S. Cl.
CPC .............. *H04L 45/563* (2013.01); *G06F 8/65* (2013.01); *H04L 41/082* (2013.01); *H04W 8/24* (2013.01); *H04W 12/12* (2013.01); *H04L 2212/00* (2013.01)

(58) Field of Classification Search
CPC ..... G06F 8/65; H04L 41/026; H04L 41/0813; H04L 41/082; H04L 45/563; H04L 2212/00; H04W 8/24; H04W 12/03; H04W 12/037; H04W 12/06; H04W 12/12; H04W 12/35; H04W 12/40

See application file for complete search history.

(56) References Cited

U.S. PATENT DOCUMENTS 10,412,588 B1* 9/2019 Anandan ................. H04W 8/20
11,184,756 B2* 11/2021 Gupta ..................... H04W 8/16
2019/0174449 A1 6/2019 Shan et al.
(Continued)

OTHER PUBLICATIONS

Nokia et al., New WID on 5GS Enhanced support of OTA mechanism for UICC configuration parameter update, 3GPP CT WG1 Meeting #119, C1-194997, 3 pages, Aug. 2019.*

(Continued)

*Primary Examiner* — Frank Duong
(74) *Attorney, Agent, or Firm* — Alston & Bird LLP

(57) ABSTRACT

A method, apparatus, and computer program product provide for updating configuration parameters of a universal integrated circuit card via dedicated network functions in a 5G system. In the context of a method, the method receives an encapsulation request from a unified data management module, the encapsulation request comprising data for at least one configuration parameter associated with a universal integrated circuit card of a user device. The method generates, in response to the encapsulation request, a secure packet comprising the at least one configuration parameter and a secure packet header. The method also provides the secure packet to the unified data management module for delivery to the user device.

20 Claims, 12 Drawing Sheets

(51) Int. Cl.
*H04W 12/12* (2021.01)
*H04W 8/24* (2009.01)

(56) References Cited

U.S. PATENT DOCUMENTS

| | | | | |
|---|---|---|---|---|
| 2019/0182655 | A1* | 6/2019 | Gupta | H04W 12/06 |
| 2019/0268752 | A1* | 8/2019 | Buckley | H04W 8/06 |
| 2020/0112906 | A1* | 4/2020 | Chaponniere | H04W 8/26 |
| 2020/0236527 | A1* | 7/2020 | Sood | H04W 8/04 |
| 2020/0305001 | A1* | 9/2020 | Li | H04W 12/102 |
| 2021/0160691 | A1* | 5/2021 | Liu | H04L 63/0428 |
| 2021/0345282 | A1* | 11/2021 | Campbell | H04W 8/06 |
| 2021/0409934 | A1* | 12/2021 | Tiwari | H04W 12/30 |

OTHER PUBLICATIONS

"3rd Generation Partnership Project; Technical Specification Group Core Network and Terminals; Secured packet structure for (Universal) Subscriber Identity Module (U)SIM Toolkit applications(Release 15)", 3GPP TS 31.115, V15.0.0, Jan. 2019, pp. 1-18.

"Smart Cards; Secured packet structure for UICC based applications (Release 13)", ETSI TS 102 225, V 13.0.0, Jul. 2018, pp. 1-23.

"3rd Generation Partnership Project; Technical Specification Group Services and System Aspects; Security architecture and procedures for 5G system (Release 15)", 3GPP TS 33.501, V15.5.0, Jun. 2019, pp. 1-190.

"Pseudo-CR on the Necessary Modifications to Change OTAF NF Name to SP-AF", 3GPP TSG-CT WG4 Meeting #96, C4-201217, Agenda : 6 1.16, Orange, Feb. 24-28, 2020, 11 pages.

"3rd Generation Partnership Project; Technical Specification Group Core Network and Terminals; 5G System; Secured Packet Application Function (SP-AF) Services; Stage 3 (Release 16)", 3GPP TS 29.544, V16.1.0, Jul. 2020, pp. 1-18.

International Search Report and Written Opinion received for corresponding Patent Cooperation Treaty Application No. PCT/FI2020/050527, dated Nov. 10, 2020, 16 pages.

"3rd Generation Partnership Project; Technical Specification Group Core Network and Terminals; 5G System; Unified Data Management Services; Stage 3 (Release 16)", 3GPP TS 29.503, V16.0.0, Jun. 2019, pp. 1-205.

"New Solution: Protected UE Configuration Update Commands", 3GPP TSG SA WG3 (Security) Meeting #90, S3-180374, Agenda : 7.2.16, Ericsson, Jan. 22-26, 2018, 3 pages.

"3rd Generation Partnership Project; Technical Specification Group Core Network and Terminals; Non-Access-Stratum (NAS) functions related to Mobile Station (MS) in idle mode (Release 16)", 3GPP TS 23.122, V16.2.0, Jun. 2019, pp. 1-72.

First Examination Report for Indian Application No. 202247013081 dated Jul. 25, 2022, 10 pages.

\* cited by examiner

OTAF Secure Packet Service Discovery

METHOD AND APPARATUS FOR UNIVERSAL INTEGRATED CIRCUIT CARD UPDATE VIA DEDICATED NETWORK FUNCTION

CROSS-REFERENCE TO RELATED APPLICATIONS

This application claims priority to U.S. Provisional Patent Application Ser. No. 62/888,268, filed on Aug. 16, 2019, the contents of which are hereby incorporated by reference in their entirety.

TECHNOLOGICAL FIELD

The subject matter described herein relates to wireless communications, and more particularly, to updating parameters associated with a universal integrated circuit card.

BACKGROUND

Telecommunication networks, such as the fifth generation of mobile networks (5G networks) are expected to be the next major phase of mobile telecommunication standards and to bring many improvements in mobile network user experience. For instance, 5G networks should provide new technical solutions allowing a greater throughput, lower latency, higher reliability, higher connectivity and higher mobility range. In addition to these improvements in terms of performance, 5G networks are also expected to extend the flexibility in the network usage and to allow providing users with a wider range of use cases and business models.

In wireless telecommunications, roaming helps to ensure that a traveling wireless user device, such as a mobile phone or the like, is kept connected to a network without breaking the connection. For example, if the user device travels beyond a network provider's transmitter range, the user device may automatically connect another network provider's service, where it is available. Steering of roaming (SOR) is the process by which a mobile operator decides which partner their subscribers will use whilst roaming. This feature allows a home public land mobile network (HPLMN) to steer a user device at any time towards a specific visited public land mobile network (VPLMN) based on HPLMN policy and roaming agreements with one or more VPLMNs. These choices are usually exercised to take advantage of better prices from partners or to allow bi-lateral agreements with partners to be honored.

In a 5G system, SOR features are based on policy and preconfigured information. However, there is a need to enable dynamic steering of user devices, and additionally, to protect SOR information and other information stored in a UICC in order to prevent eavesdropping and/or other temptations when being updated and/or transmitted.

BRIEF SUMMARY

A method, apparatus, and computer program product are disclosed for updating configuration parameters of a universal integrated circuit card via dedicated network functions in a 5G system. In an example embodiment, a method is provided that comprises receiving, at an over-the-air function module, an encapsulation request from a unified data management module. In some embodiments, the encapsulation request comprises data for at least one configuration parameter associated with a universal integrated circuit card of a user device. The method further comprises generating, in response to the encapsulation request, a secure packet comprising the at least one configuration parameter and a secure packet header. The method also comprises providing the secure packet to the unified data management module for delivery to the user device. In some embodiments, the secure packet comprising the at least one configuration parameter and the secure packet header is generated via a secure packet library associated with the over-the-air function module. In an embodiment, the encapsulation request is received from the unified data management model via a $N_{otaf}$_SecPkt_CommandReq command associated with over-the-air function module. In some embodiments, generating the secure packet comprising the at least one configuration parameter and the secure packet header comprises generating and providing, by the over-the-air function module, an encapsulation request to an over-the-air gateway and receiving, from the over-the-air gateway and in response to the encapsulation request, the secure packet generated by the over-the-air gateway. In an embodiment, the unified data management module and the over-the-air function module are co-located, and the over-the-air function module provides one or more commands of an application programming interface associated with the over-the-air function module to the unified data management module for generating the secure packet. In some embodiments, the method further comprises delivering the secure packet to the user device via a non-access stratum control message over a fifth-generation system (5GS) core network. In some embodiments, the at least one configuration parameter is associated with steering of roaming information. In some embodiments, the method further comprises registering an over-the-air function module function type, over-the-air function module instance ID and a secure packet service associated with the over-the-air function module to a network repository function and receiving, from the network repository function, confirmation that the secure packet service has been registered against the over-the-air function module instance ID.

In a further example embodiment, an apparatus is provided comprising at least one processor; and at least one memory including computer program code configured to, with the at least one processor, cause the apparatus at least to receive an encapsulation request comprising data for at least one configuration parameter associated with a universal integrated circuit card of a user device. The apparatus may also be configured to generate, in response to the encapsulation request, a secure packet comprising the at least one configuration parameter and a secure packet header. The apparatus may also be configured to provide the secure packet for delivery to the user device. In some embodiments, the secure packet comprising the at least one configuration parameter and the secure packet header is generated via a secure packet library associated with the over-the-air function module. In an embodiment, the encapsulation request is received from the unified data management model via a $N_{otaf}$_SecPkt_CommandReq command associated with over-the-air function module. In some embodiments, generating the secure packet comprising the at least one configuration parameter and the secure packet header comprises generating and providing, by the over-the-air function module, an encapsulation request to an over-the-air gateway and receiving, from the over-the-air gateway and in response to the encapsulation request, the secure packet generated by the over-the-air gateway. In an embodiment, the unified data management module and the over-the-air function module are co-located, and the over-the-air function module provides one or more commands of an application programming interface associated with the over-the-air function module to the unified data management module for generating the secure packet. In some embodiments, the apparatus may be further configured to deliver the secure packet to the user device via a non-access stratum control message over a fifth-generation system (5GS) core network. In some embodiments, the at least one configuration parameter is associated with steering of roaming information. In some embodiments, the apparatus may be further configured to register an over-the-air function module function type, over-the-air function module instance ID and a secure packet service associated with the over-the-air function module to a network repository function and to receive, from the network repository function, confirmation that the secure packet service has been registered against the over-the-air function module instance ID.

In another example embodiment, an apparatus is provided comprising means for receiving an encapsulation request comprising data for at least one configuration parameter associated with a universal integrated circuit card of a user device. The apparatus also comprises means for generating, in response to the encapsulation request, a secure packet comprising the at least one configuration parameter and a secure packet header. The apparatus also comprises means for providing the secure packet for delivery to the user device. In some embodiments, the secure packet comprising the at least one configuration parameter and the secure packet header is generated via a secure packet library associated with the over-the-air function module. In an embodiment, the encapsulation request is received from the unified data management model via a $N_{otaf}$_SecPkt_CommandReq command associated with over-the-air function module. In some embodiments, generating the secure packet comprising the at least one configuration parameter and the secure packet header comprises generating and providing, by the over-the-air function module, an encapsulation request to an over-the-air gateway and receiving, from the over-the-air gateway and in response to the encapsulation request, the secure packet generated by the over-the-air gateway. In an embodiment, the unified data management module and the over-the-air function module are co-located, and the over-the-air function module provides one or more commands of an application programming interface associated with the over-the-air function module to the unified data management module for generating the secure packet. In some embodiments, the apparatus comprises means for delivering the secure packet to the user device via a non-access stratum control message over a fifth-generation system (5GS) core network. In some embodiments, the at least one configuration parameter is associated with steering of roaming information. In some embodiments, the apparatus comprises means for registering an over-the-air function module function type, over-the-air function module instance ID and a secure packet service associated with the over-the-air function module to a network repository function and means for receiving, from the network repository function, confirmation that the secure packet service has been registered against the over-the-air function module instance ID.

In a further example embodiment, a computer program product is provided comprising a non-transitory computer readable storage medium having program code portions stored thereon, the program code portions configured, upon execution, to receive an encapsulation request comprising data for at least one configuration parameter associated with a universal integrated circuit card of a user device. The program code portions may be further configured, upon execution, to generate, in response to the encapsulation request, a secure packet comprising the at least one configuration parameter and a secure packet header. The program code portions may be further configured, upon execution, to provide the secure packet for delivery to the user device. In some embodiments, the secure packet comprising the at least one configuration parameter and the secure packet header is generated via a secure packet library associated with the over-the-air function module. In an embodiment, the encapsulation request is received from the unified data management model via a $N_{otaf}$_SecPkt_CommandReq command associated with over-the-air function module. In some embodiments, generating the secure packet comprising the at least one configuration parameter and the secure packet header comprises generating and providing, by the over-the-air function module, an encapsulation request to an over-the-air gateway and receiving, from the over-the-air gateway and in response to the encapsulation request, the secure packet generated by the over-the-air gateway. In an embodiment, the unified data management module and the over-the-air function module are co-located, and the over-the-air function module provides one or more commands of an application programming interface associated with the over-the-air function module to the unified data management module for generating the secure packet. In some embodiments, the program code portions may be further configured, upon execution, to deliver the secure packet to the user device via a non-access stratum control message over a fifth-generation system (5GS) core network. In some embodiments, the at least one configuration parameter is associated with steering of roaming information. In some embodiments, the program code portions may be further configured, upon execution, to register an over-the-air function module function type, over-the-air function module instance ID and a secure packet service associated with the over-the-air function module to a network repository function. The program code portions may be further configured, upon execution, to receive, from the network repository function, confirmation that the secure packet service has been registered against the over-the-air function module instance ID.

In a further example embodiment, a method is provided comprising receiving, at a unified data management module, a configuration parameter notification from a unified data repository. The method further comprises generating, in response to the configuration parameter notification, a request to retrieve at least one configuration parameter from the unified data repository. The method also comprises generating, via a secure packet service, a secure packet comprising the at least one configuration parameter. The method also comprises transporting, via a non-access stratum control plane message, the secure packet to the user device. In some embodiments, the configuration parameter notification comprises data associated with at least one configuration parameter associated with a universal integrated circuit card of a user device. In some embodiments, the at least one configuration parameter is associated with a routing identifier. In some embodiments, the at least one configuration parameter is associated with steering of roaming information. In some embodiments, the method further comprises discovering, via a network repository function and at a unified data management module, an over-the-air function module comprising the secure packet service. In some embodiments, the method further comprises receiving, in response to the discovery, data associated with the over-the-air function module. In some embodiments, the received data associated with the over-the-air function module comprises an OTAF_instance_ID and a fully qualified domain name (FQDN) or internet protocol (IP) address. In some embodiments, the method further comprises receiving, from the network repository function, confirmation that the secure packet service has been registered against the OTAF_instance_ID.

In another example embodiment, an apparatus is provided comprising at least one processor; and at least one memory including computer program code configured to, with the at least one processor, cause the apparatus at least to receive a configuration parameter notification from a unified data repository. The apparatus may also be configured to generate, in response to the configuration parameter notification, a request to retrieve at least one configuration parameter from the unified data repository. The apparatus may also be configured to generate, via a secure packet service, a secure packet comprising the at least one configuration parameter. The apparatus may also be configured to transport, via a non-access stratum control plane message, the secure packet to the user device. In some embodiments, the configuration parameter notification comprises data associated with at least one configuration parameter associated with a universal integrated circuit card of a user device. In some embodiments, the at least one configuration parameter is associated with a routing identifier. In some embodiments, the at least one configuration parameter is associated with steering of roaming information. In some embodiments, the apparatus may further be configured to discover, via a network repository function and at a unified data management module, an over-the-air function module comprising the secure packet service. In some embodiments, the apparatus may further be configured to receive, in response to the discovery, data associated with the over-the-air function module. In some embodiments, the received data associated with the over-the-air function module comprises an OTAF_instance_ID and a fully qualified domain name (FQDN) or internet protocol (IP) address. In some embodiments, the apparatus may further be configured to receive, from the network repository function, confirmation that the secure packet service has been registered against the OTAF_instance_ID.

In another example embodiment, an apparatus is provided comprising means for receiving a configuration parameter notification from a unified data repository. The apparatus also comprises means for generating, in response to the configuration parameter notification, a request to retrieve at least one configuration parameter from the unified data repository. The apparatus also comprises means for generating, via a secure packet service, a secure packet comprising the at least one configuration parameter. The apparatus also comprises means for transporting, via a non-access stratum control plane message, the secure packet to the user device. In some embodiments, the configuration parameter notification comprises data associated with at least one configuration parameter associated with a universal integrated circuit card of a user device. In some embodiments, the at least one configuration parameter is associated with a routing identifier. In some embodiments, the at least one configuration parameter is associated with steering of roaming information. In some embodiments, the apparatus also comprises means for discovering, via a network repository function and at a unified data management module, an over-the-air function module comprising the secure packet service. In some embodiments, the apparatus also comprises means for receiving, in response to the discovery, data associated with the over-the-air function module. In some embodiments, the received data associated with the over-the-air function module comprises an OTAF_instance_ID and a fully qualified domain name (FQDN) or internet protocol (IP) address. In some embodiments, the apparatus also comprises means for receiving, from the network repository function, confirmation that the secure packet service has been registered against the OTAF_instance_ID.

In a further example embodiment, a computer program product is provided comprising a non-transitory computer readable storage medium having program code portions stored thereon, the program code portions configured, upon execution, to receive a configuration parameter notification from a unified data repository. The program code portions are further configured, upon execution, to generate, in response to the configuration parameter notification, a request to retrieve at least one configuration parameter from the unified data repository. The program code portions are further configured, upon execution, to generate, via a secure packet service, a secure packet comprising the at least one configuration parameter. The program code portions are further configured, upon execution, to transport, via a non-access stratum control plane message, the secure packet to the user device. In some embodiments, the configuration parameter notification comprises data associated with at least one configuration parameter associated with a universal integrated circuit card of a user device. In some embodiments, the at least one configuration parameter is associated with a routing identifier. In some embodiments, the at least one configuration parameter is associated with steering of roaming information. In some embodiments, the program code portions are further configured, upon execution, to discover, via a network repository function and at a unified data management module, an over-the-air function module comprising the secure packet service. In some embodiments, the program code portions are further configured, upon execution, to receive, in response to the discovery, data associated with the over-the-air function module. In some embodiments, the received data associated with the over-the-air function module comprises an OTAF_instance_ID and a fully qualified domain name (FQDN) or internet protocol (IP) address. In some embodiments, the program code portions are further configured, upon execution, to receive, from the network repository function, confirmation that the secure packet service has been registered against the OTAF_instance_ID.

BRIEF DESCRIPTION OF THE DRAWINGS

Figure 1A:
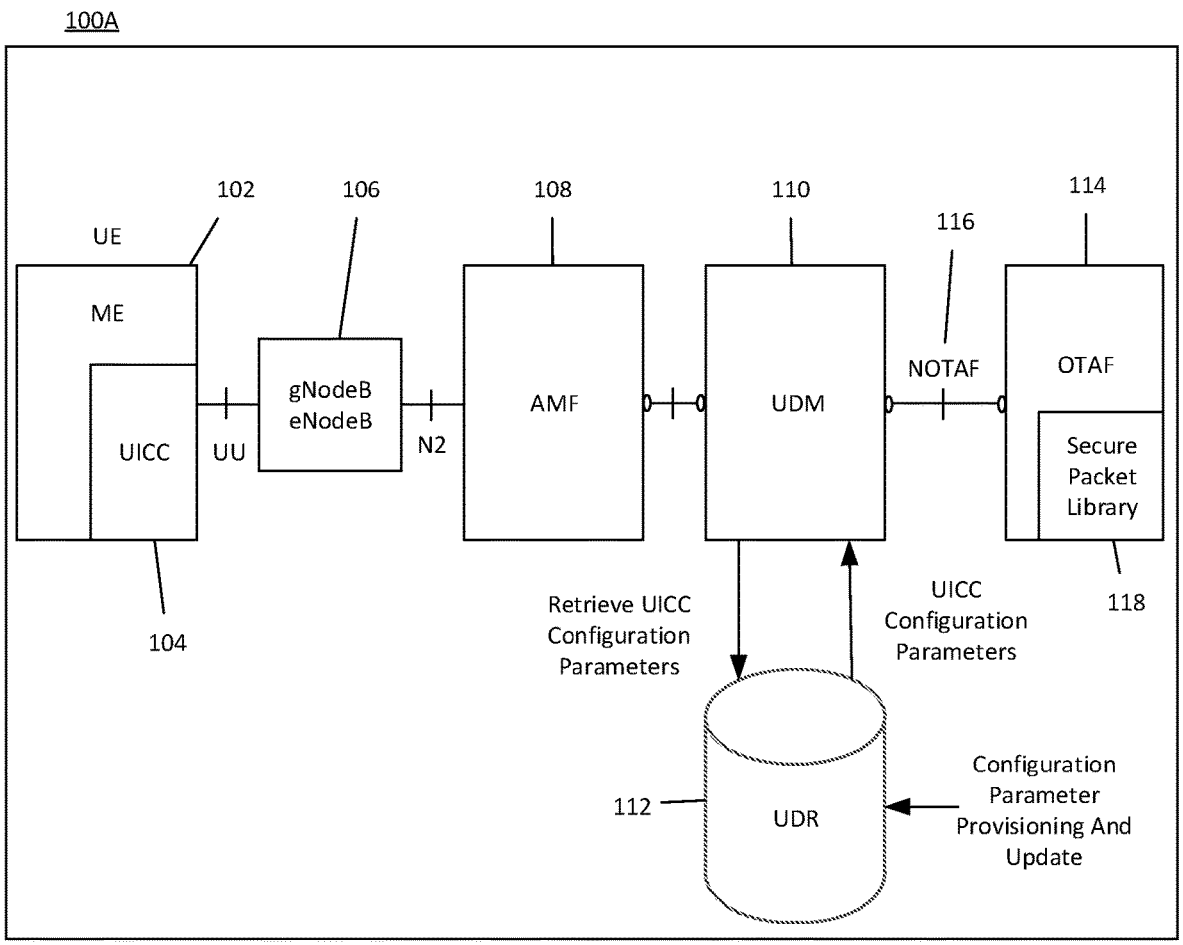
Figure 1B:
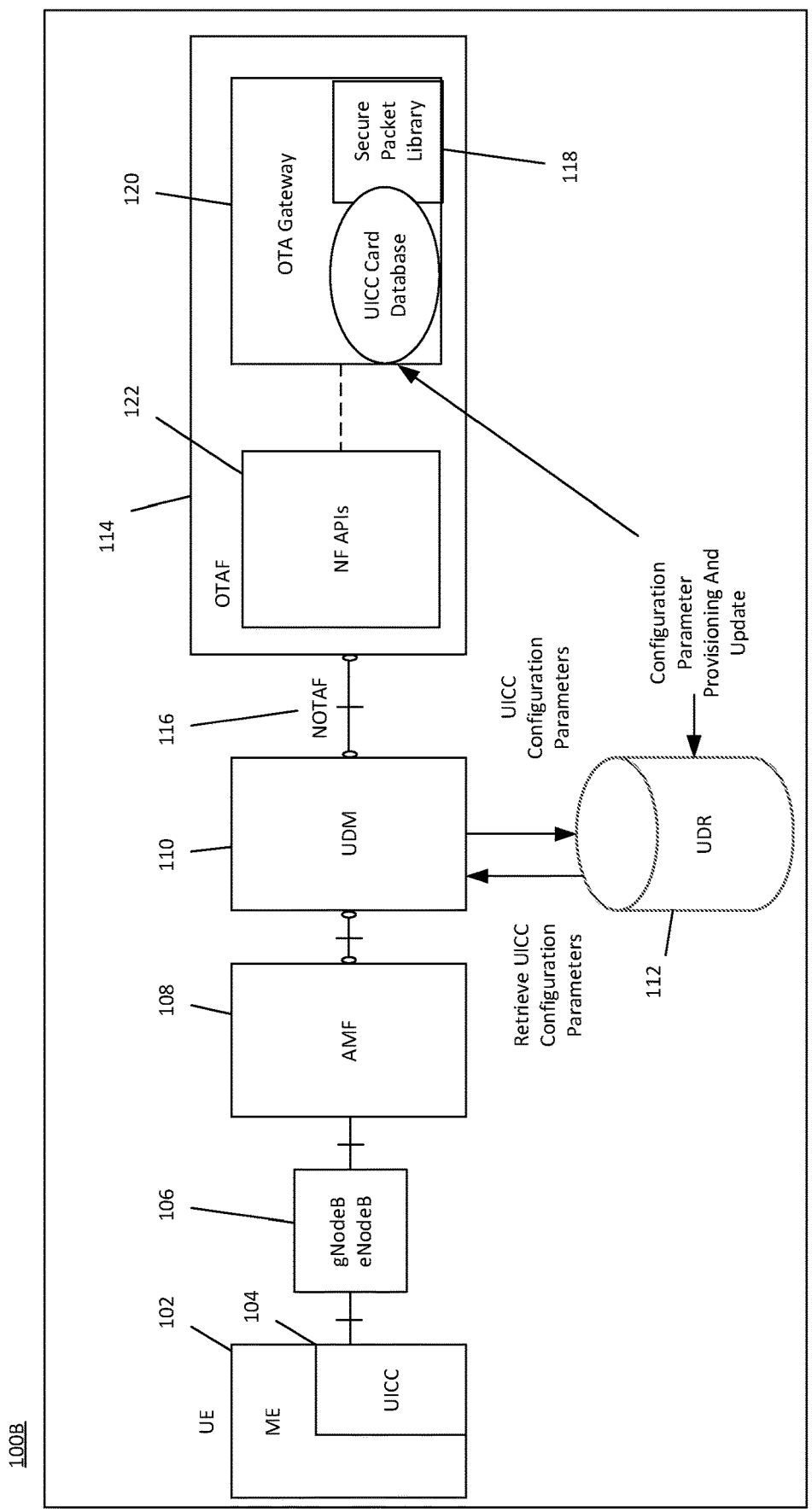
Figure 1C:
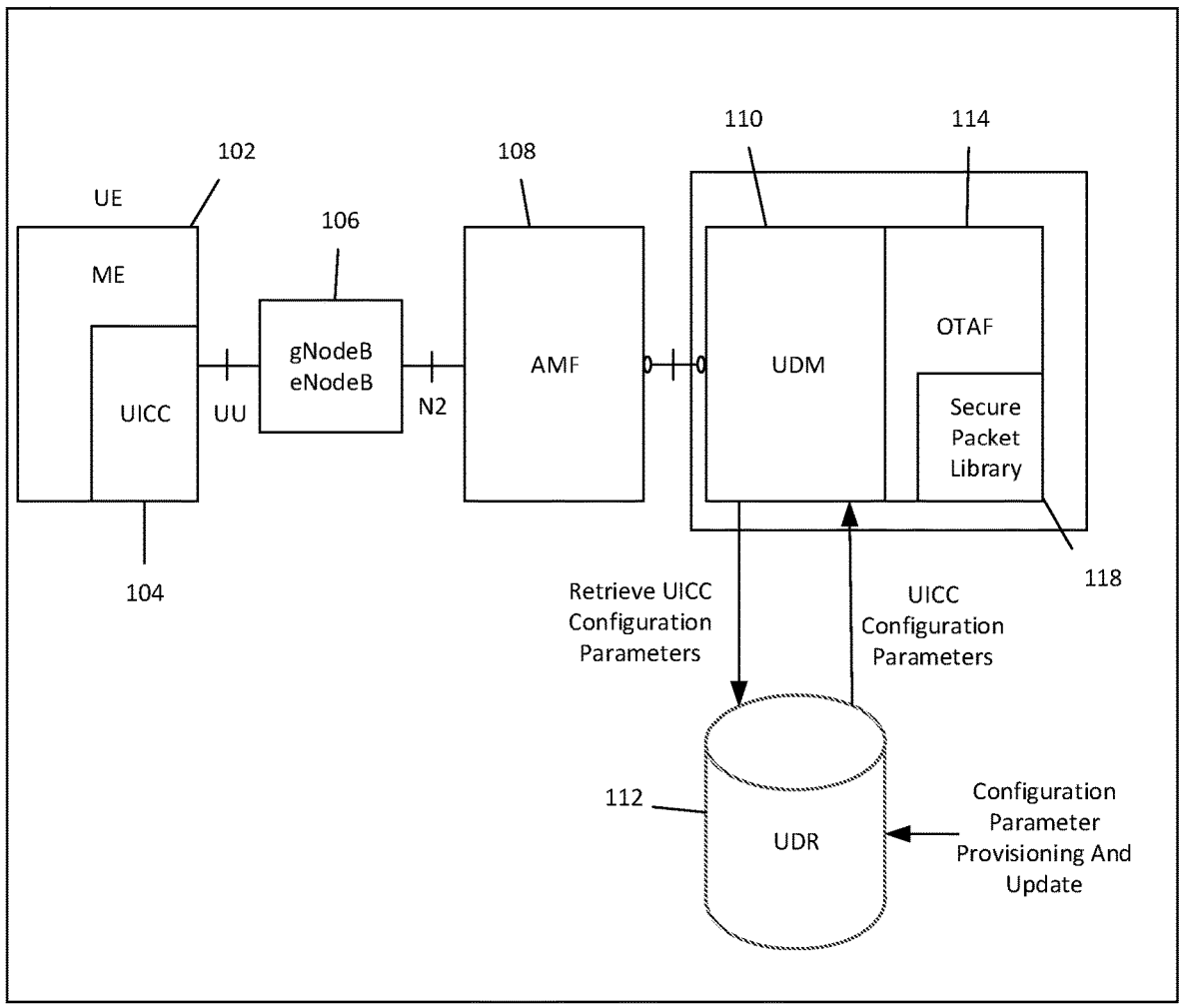
Figure 2:
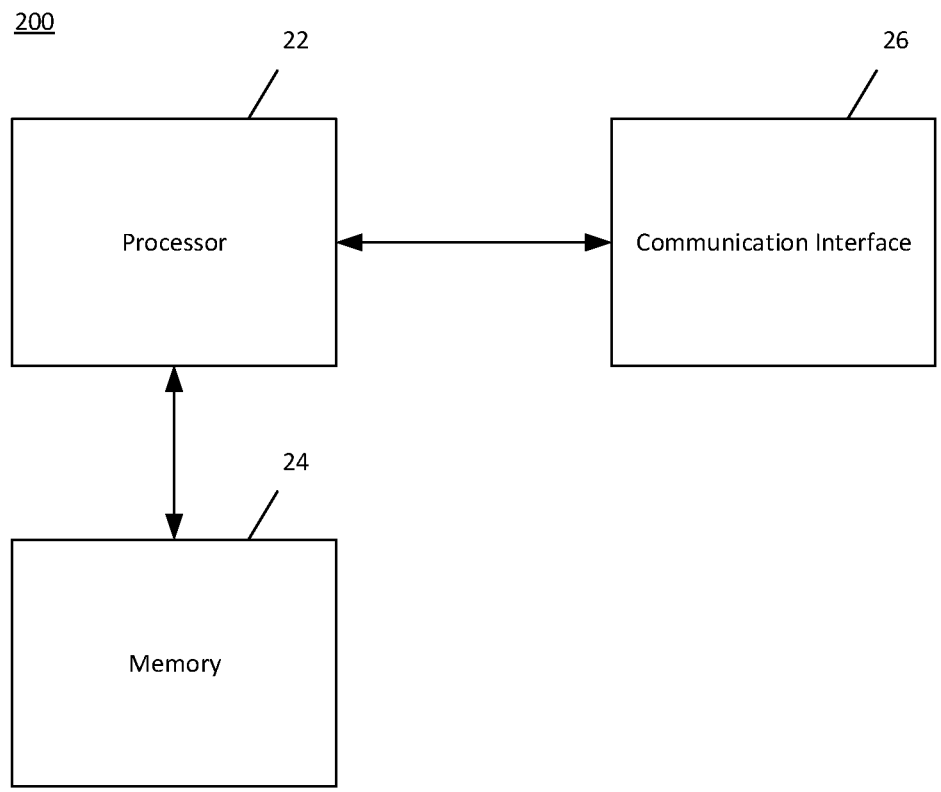
Figure 3A:
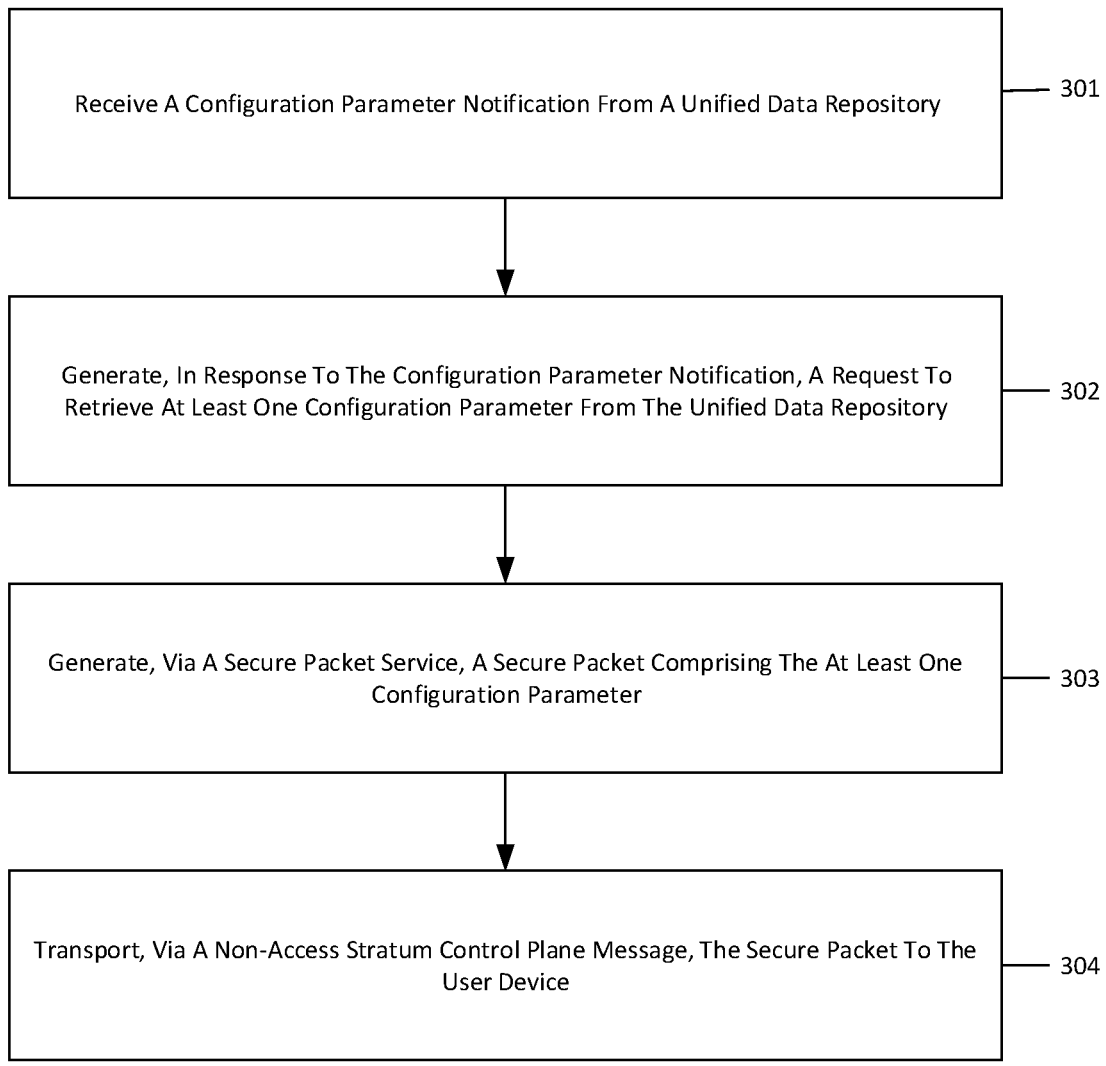
Figure 3B:
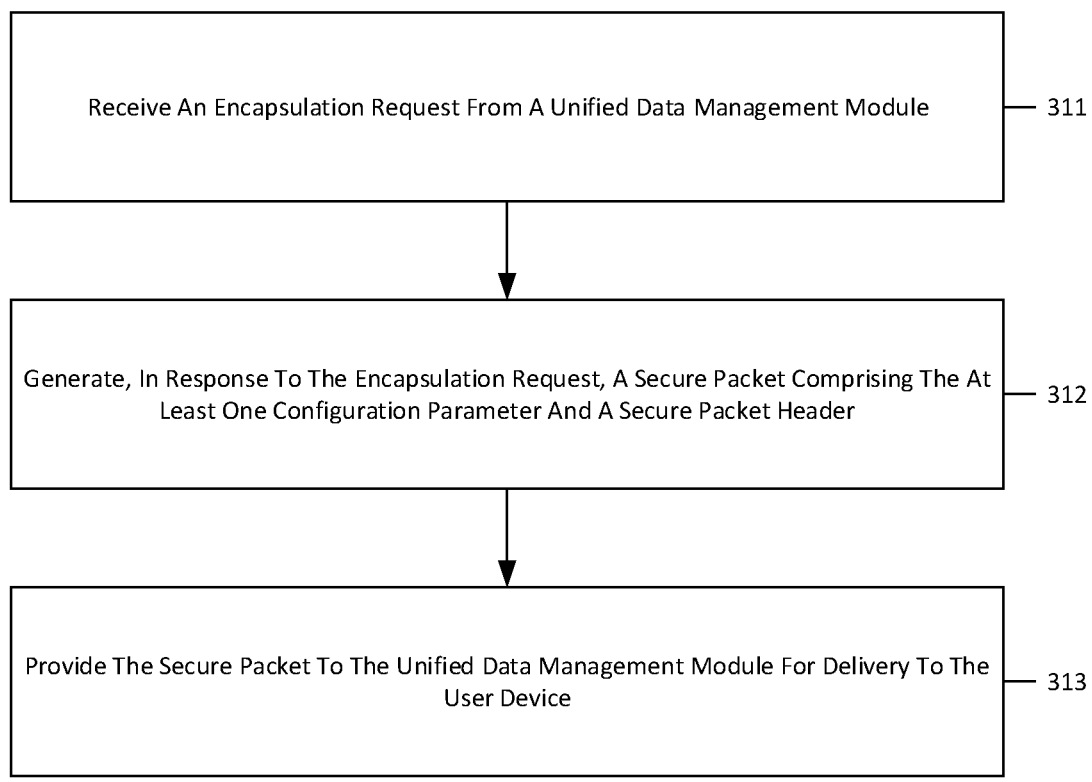
Figure 4A:
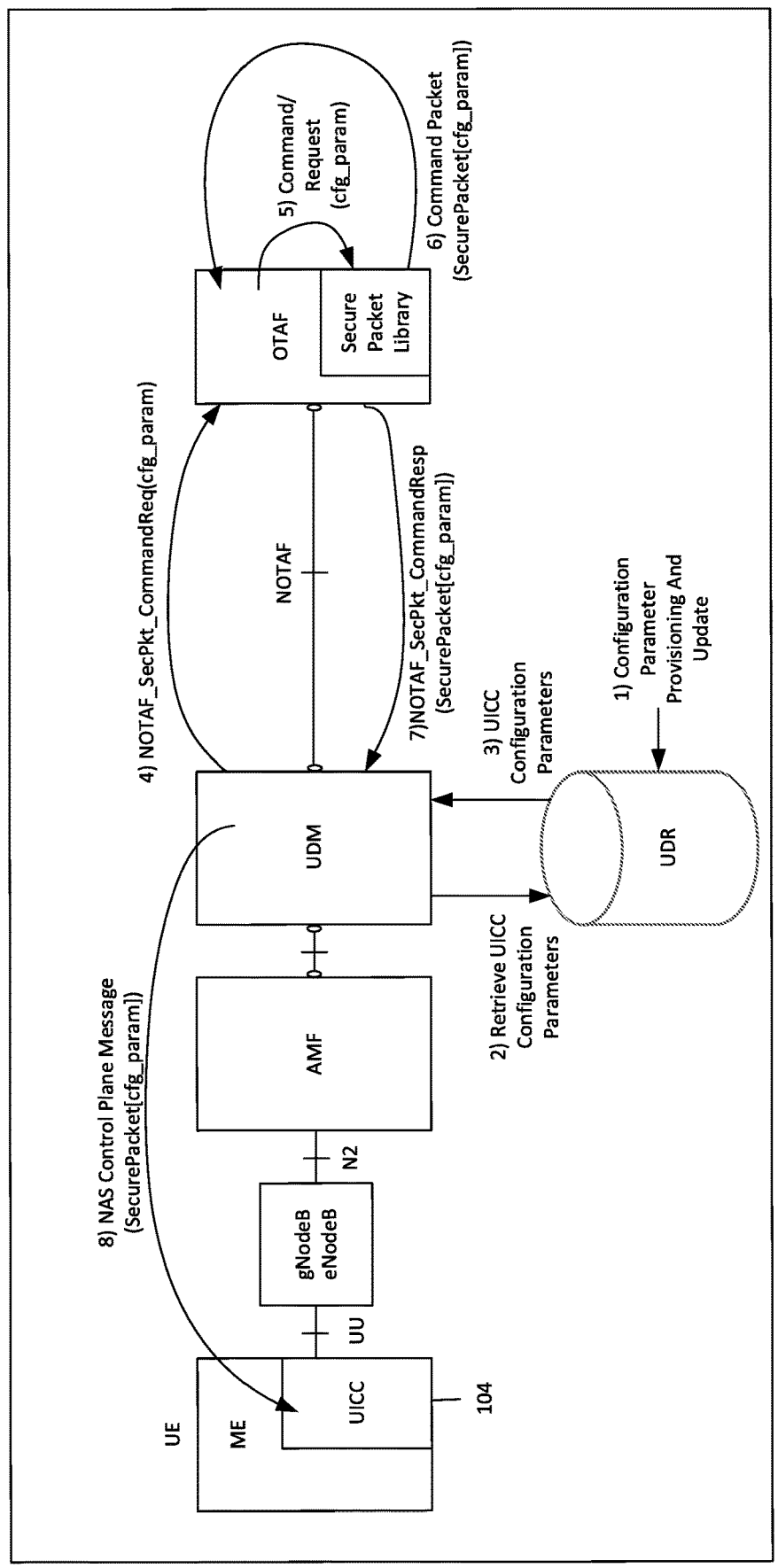
Figure 4B:
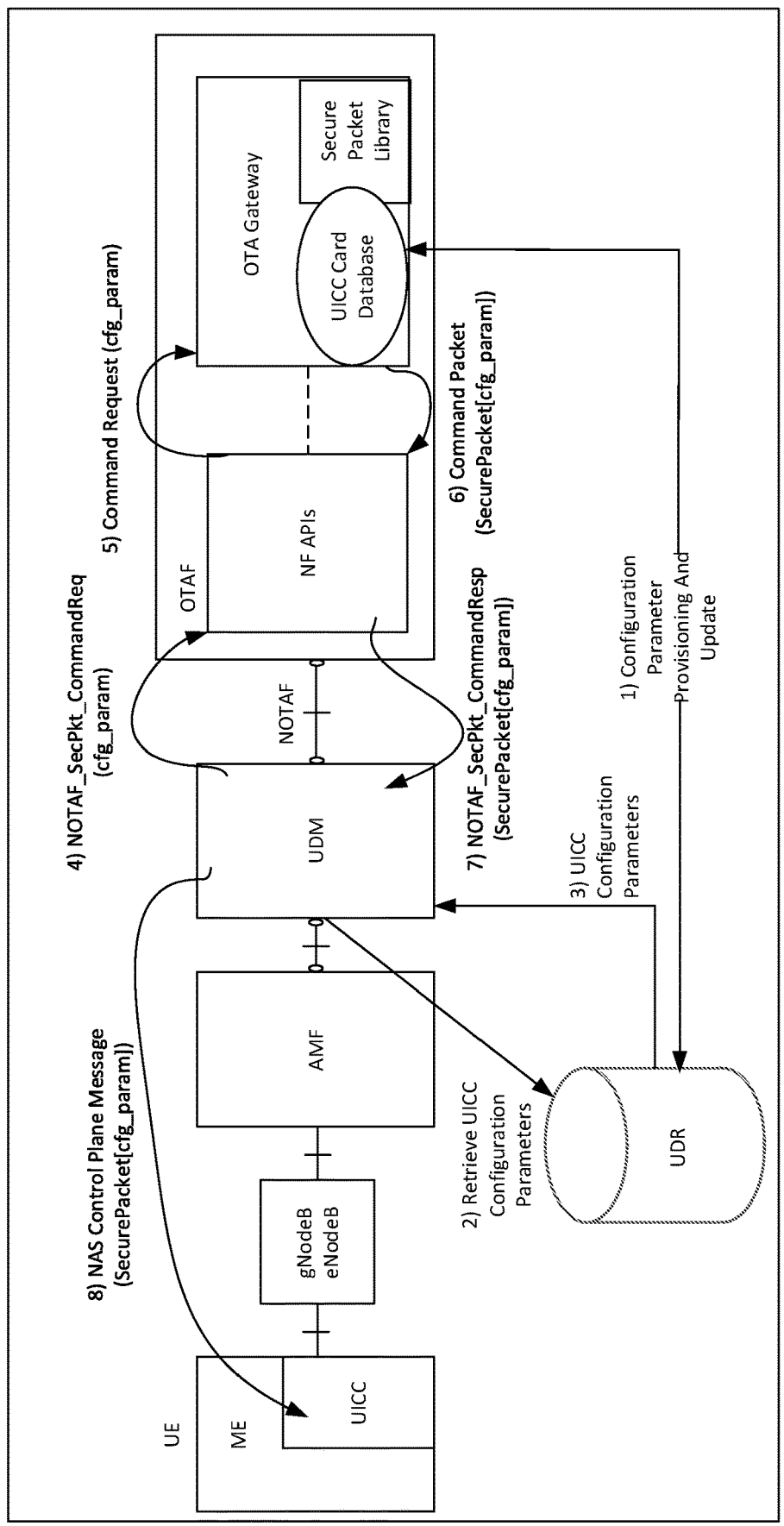
Figure 4C:
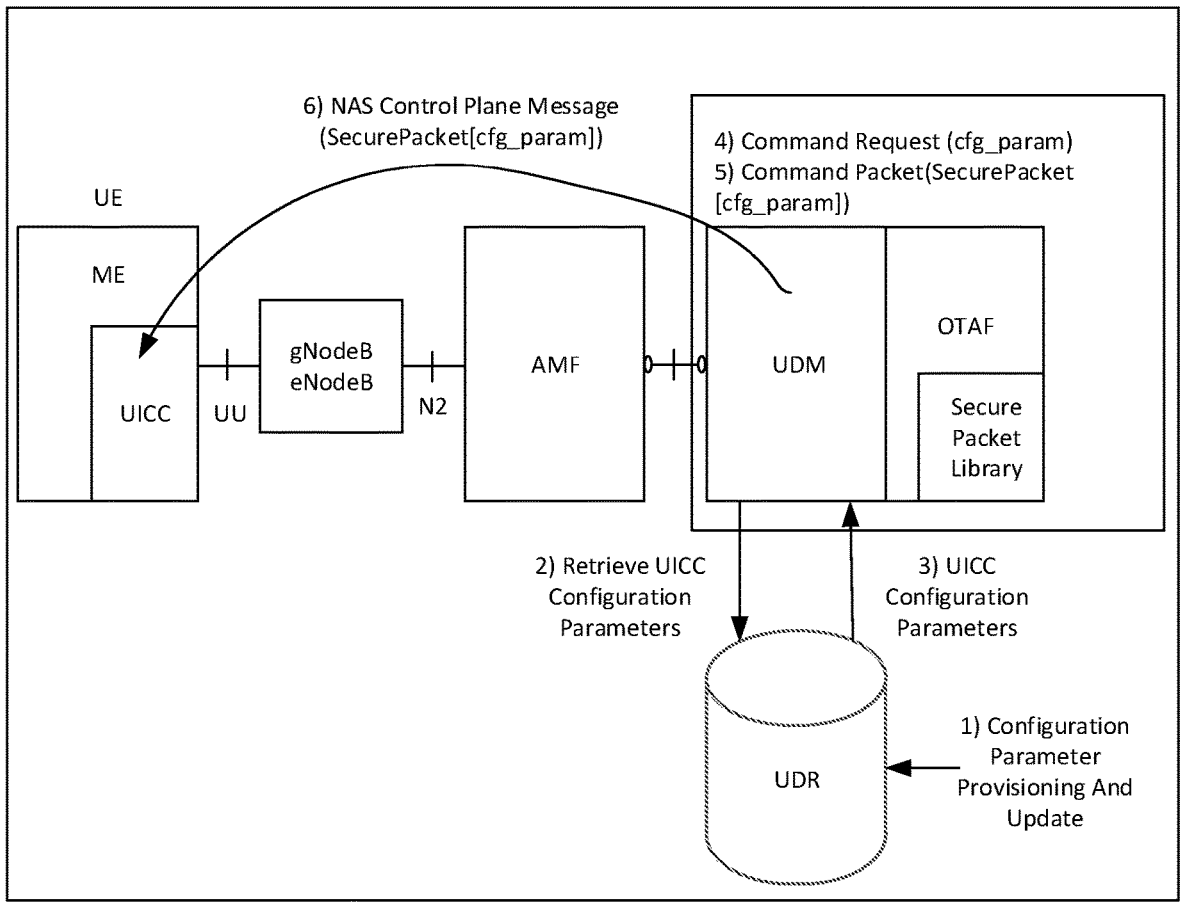
Figure 5A:
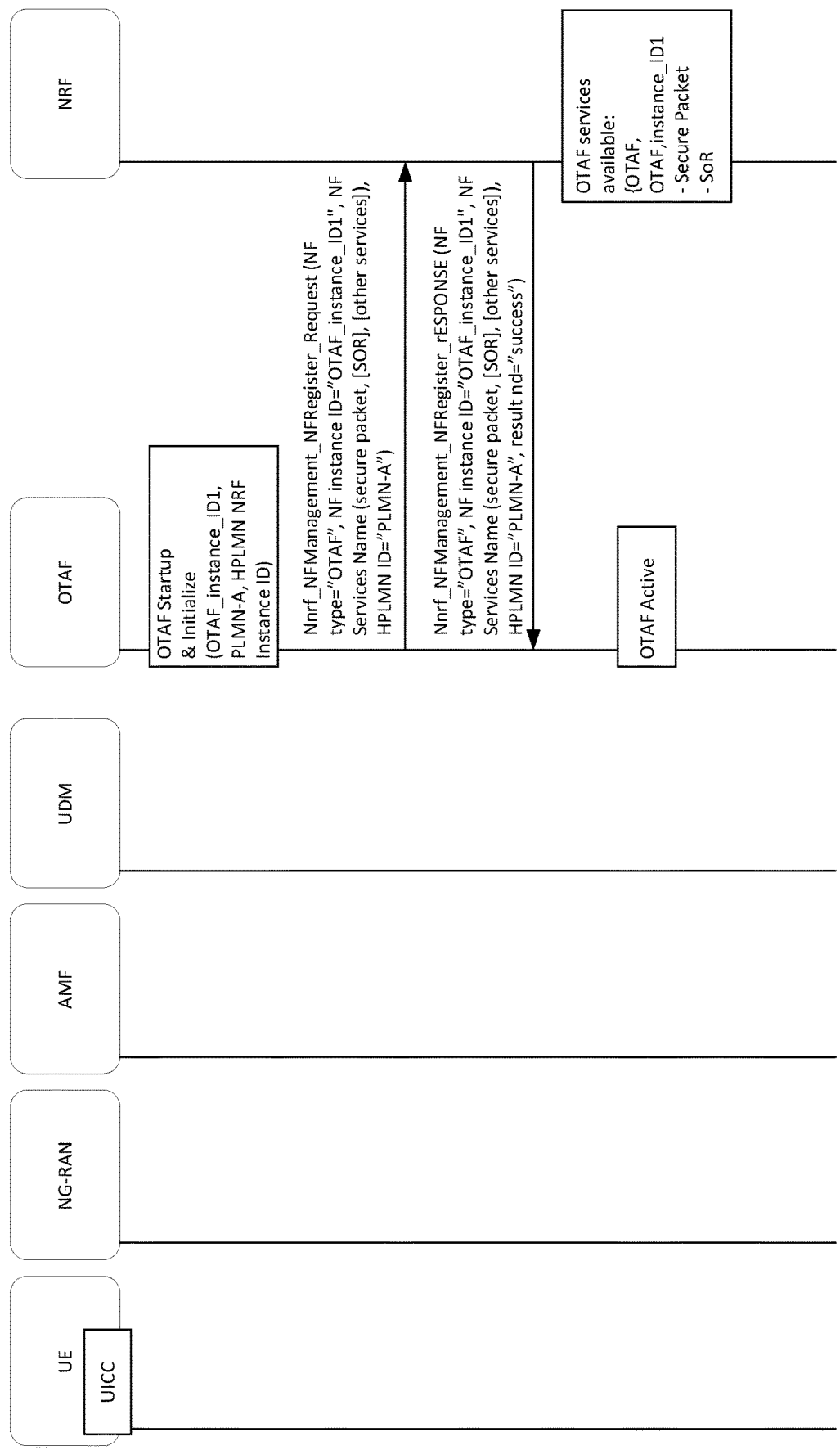
Figure 5B:
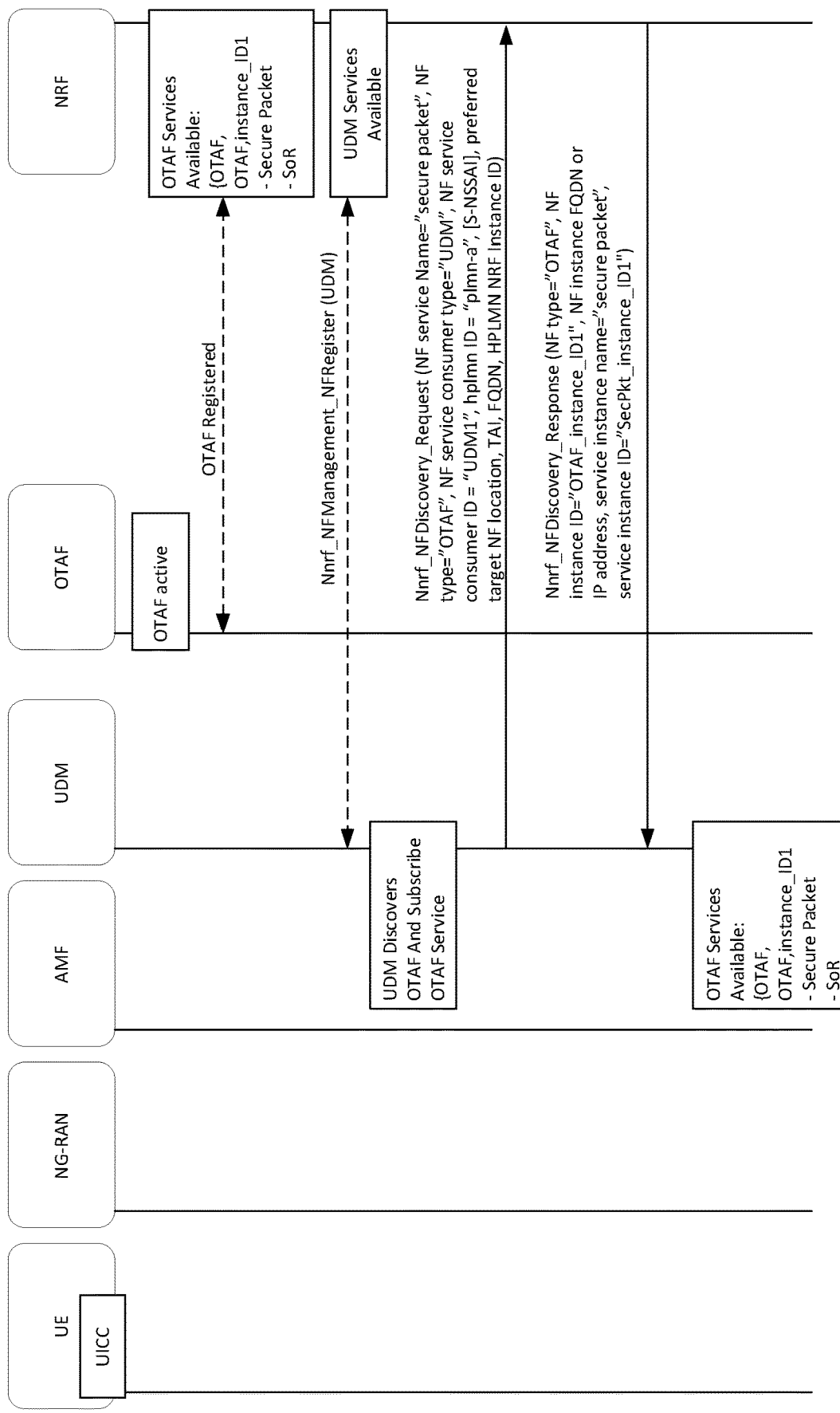
Figure 5C:
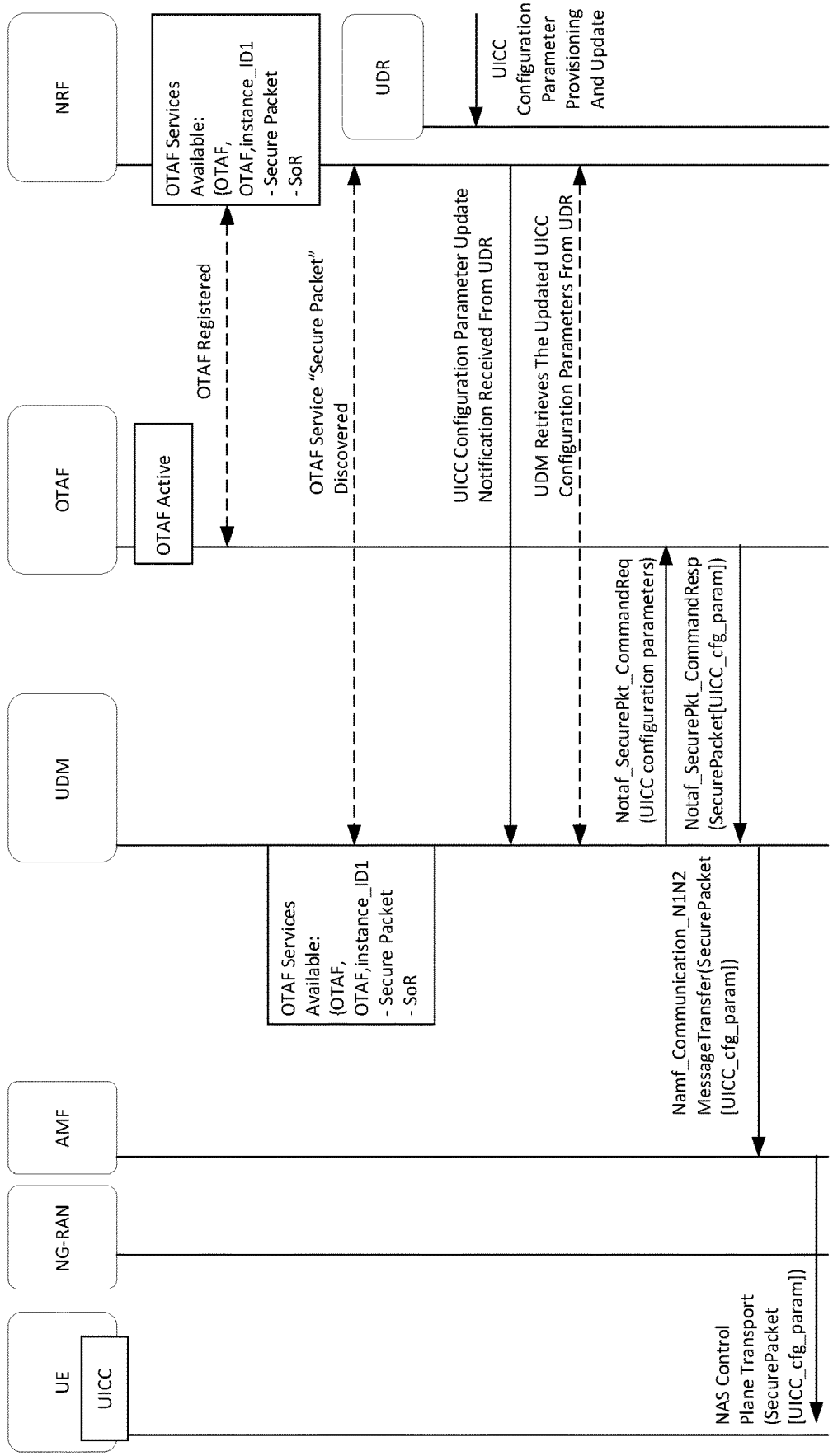

Having thus described certain example embodiments of the present disclosure in general terms, reference will hereinafter be made to the accompanying drawings, which are not necessarily drawn to scale, and wherein:

FIGS. 1A-C are block diagrams of example network configurations in accordance with embodiments of the present disclosure;

FIG. 2 is a block diagram of an apparatus that may be specifically configured in accordance with an example embodiment of the present disclosure;

FIG. 3A is a flow chart illustrating the operations performed in accordance with an example embodiment;

FIG. 3B is a flow chart illustrating the operations performed in accordance with an example embodiment;

FIGS. 4A-C are block diagrams illustrating operations performed in accordance with example embodiments of the present disclosure; and FIGS. 5A-C are signal diagrams illustrating operations performed in accordance with example embodiments of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Additionally, as used herein, the term 'module' refers to hardware or a combination of hardware and software in which the execution of the software directs operation of the hardware.

Traditionally, and prior to fifth-generation (5G) systems, updating configuration information stored in a wireless device card, such as a Subscriber Identity Module (SIM) card or Universal Subscriber Identity Module (USIM) card, using secure packet mechanisms require deployment of a dedicated over-the-air (OTA) gateway network element. The OTA gateway receives a service request with updated configuration information from an operator's back-end system and encapsulates the updated configuration information into a secure packet format, and then into a short message services (SMS) format. The data is then sent to a Short Message Services Center (SMSC), which transmits the data to SIM/USIM cards in a user device.

5G systems share a similar device-side interface to prior systems, along with a Universal Integrated Circuit Card (UICC) replacing SIM/USIM cards. However, on the network side of 5G, no method has been defined on how secure packet transfer mechanisms may be realized. For example, the 3$^{rd}$ Generation Partnership Project (3GPP) has specified that when UICC configuration parameters (e.g., SOR parameters) need to be updated, a Unified Data Management (UDM) module may apply protection via a combination of security key-based mechanism and a secure packet mechanism. However, no method is specified on how UDM can encapsulate configuration parameter updates into a secure packet. For example, as 5G system network functions are all service-based and reside in the cloud, operators (e.g., network providers) that have an OTA gateway deployed as part of their network have no service-based interface to allow 5G systems to access secure packet libraries included in the OTA gateway. Additionally, operators that do not have an OTA gateway deployed have no support for updating any UICC configuration parameters of user devices.

Embodiments herein provide methods to support OTA functionality in 5G systems via a service-based OTA function. In addition to the OTA function, several new 5G service architecture options are presented, as well as an OTA function services interface ("Notaf") and procedures for secure packet encapsulation of UICC configuration parameters in a 5G system.

FIG. 1A depicts an example of a portion of a 5G wireless network 100A deployed in accordance with some example embodiments. The 5G wireless network 100A may include a user device 102 configured to wirelessly couple to a radio access network (RAN) (also called a core network) being served by a wireless access point 106, such as a base station, wireless local area network access point, home base station, and/or other type of wireless access point. The user device 102 may comprise a UICC 104 which may store information elements related to a mobile subscriber.

The network 100A may include the core network, which may include a core access and mobility management function (AMF) 108. The AMF 108 may be used for various network tasks such as registration management, connection management, reachability management, mobility management, and/or other various functions relating to security and access management and authorization. The network 100A and/or core network may further include non-illustrated features such as a visiting session management function (V-SMF), a visiting policy control function (v-PCF), a visiting network slice selection function (v-NSSF), and/or a visiting user plane function (V-UPF). In some embodiments, these devices may be associated with a standalone non-public network (SNPN).

In some embodiments, the network 100A and/or the core network may include devices having functions supporting a home public land mobile network (HPLMN) and corresponding functions for "home" wireless local area network (WLAN) access, offloading, and/or non-3GPP access. These devices may include a unified data management (UDM) module 110, a unified data repository 112, an over-the-air function (OTAF) module 114, and/or other non-illustrated features such as a home session management function (SMF), a home policy control function (PCF), a home network slice selection function (NSSF), an authentication server function (AUSF), an application function (AF), a home user plane function (H-UPF), and a data network (DN).

In the depicted embodiment of FIG. 1A, the OTAF module 114 may be configured within the network 100A to be a standalone network function comprising an integrated secure packet library 118. The OTAF module 114 may provide configuration service logic and one or more application programming interfaces (APIs). The UDM module 110 and the OTAF module 114 may be configured to access and/or communicate with each other via a Notaf API 116. In this regard, the UDM module 110 may access a secure packet library 118 of the over-the-air function module 114 via one or more commands associated with the Notaf API 116.

The unified data repository 112 may be used to service a number of network functions. The UDM module 110 may use the unified data repository to store and retrieve data, such as configuration parameters associated with a UICC of a user device. In an example embodiment, the UDM module 110 may retrieve configuration parameters from the unified data repository 112 and, via one or more commands of the Notaf API 116, encapsulate the configuration parameters into a secure packet prior to sending the parameters to the UICC via a control plane message over the 5G network 100A.

FIG. 1B depicts an example of a portion of a 5G wireless network 100B deployed in accordance with some example embodiments. The network 100B may comprise similar devices and functions to FIG. 1A, such as the user device 102 and associated UICC 104, wireless access point 106, AMF 108, UDM module 110, unified data repository 112, OTAF module 114, Notaf API 116, and a secure packet library 118. In the depicted embodiment, an over-the-air (OTA) gateway 120 may be collocated with the OTAF module 114. In this regard, the OTAF module 114 may comprise the OTA gateway 120. This example network configuration may be most suitable as a migration method in an instance in which an operator network (e.g., network 100B) has deployed an OTA gateway and needs to make it available for a 5G network. In an embodiment of the network architecture depicted in FIG. 1B, the OTAF module 114 is collocated with the existing OTA gateway 120 and the OTAF module 114 provides configuration service logic and one or more APIs 122, including, but not limited to, APIs for secure packet library access. The secure packet library 118 may be located in the OTA gateway 120, and the OTAF module 114 may use an interface associated with the OTA gateway 120 to access the secure packet library 118.

FIG. 1C depicts an example of a portion of a 5G wireless network 100C deployed in accordance with some example embodiments. The network may comprise similar devices and functions to FIG. 1A, such as the user device 102 and associated UICC 104, wireless access point 106, AMF 108, UDM module 110, unified data repository 112, OTAF module 114, and a secure packet library 118. In the depicted embodiment, the OTAF module 114 may be collocated with the UDM module 110. The OTAF module 114 may provide configuration service logic and one or more APIs (e.g., APIs 122) including, but not limited to, APIs for secure packet library access. The secure packet library 118 may be located in and/or integrated with the OTAF module 114. In an example embodiment, the UDM module 110 may retrieve configuration parameters from the unified data repository 112 and, via one or more commands of the one or more APIs of the OTAF module 114, encapsulate the configuration parameters into a secure packet prior to sending the parameters to the UICC via a control plane message over the 5G network 100C.

One example of an apparatus 200 that may be configured to function as and/or be embodied by the UDM module 110, OTAF module 114, AMF 108, user device 102, and/or the like is depicted in FIG. 2. As shown in FIG. 2, the apparatus includes, is associated with or is in communication with processing circuitry 22, a memory 24 and a communication interface 26. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally, or alternatively, the memory device could be configured to store instructions for execution by the processing circuitry.

The apparatus 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally, or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 3A, a method 300 performed by the UDM module 110 is depicted. As shown in block 301, the UDM module 110 includes means, such as the processing circuitry 22, the communication interface 26 or the like, for receiving a configuration parameter notification. For example, the UDM module 110 may receive the configuration parameter notification from the unified data repository 112.

In some embodiments, the configuration parameter notification may comprise data associated with at least one configuration parameter associated with a universal integrated circuit card (UICC) of a user device. For example, the data may comprise an update to a configuration parameter of the UICC, a provisioned or new configuration parameter to be added to the UICC, or both. The at least one configuration parameter may be associated with various types of configuration parameters and information of the user device and/or UICC. In an embodiment, the at least one configuration parameter may be associated with a routing identifier (e.g., routing ID information). In some embodiments, the at least one configuration parameter may be associated with steering of roaming information.

As shown in block 302 of FIG. 3A, the UDM module 110 includes means, such as the processing circuitry 22, the communication interface 26 or the like, for generating a request to retrieve at least one configuration parameter from the unified data repository 112. For example, the request may be generated in response to the received configuration parameter notification. After providing the request to the unified data repository 112, the UDM module 110 may receive the at least one configuration parameter from the unified data repository 112.

At block 303, the UDM module 110 may generate a secure packet comprising the at least one configuration parameter. In this regard, the UDM module 110 includes means, such as the processing circuitry 22, the communication interface 26 or the like, for generating a secure packet comprising the at least one configuration parameter. In one embodiment, the UDM module 110 may generate the secure packet comprising the at least one configuration parameter by invoking a secure packet service (e.g., a secure packet library) associated with an over-the-air function module (e.g., over-the-air function module 114). In this regard, the UDM module 110 may invoke one or more commands associated with an OTA function services interface 116.

In an embodiment, the UDM module 110 may invoke a command associated with the OTA function services interface 116 in order to generate an encapsulation request. The encapsulation request may comprise data for at least one configuration parameter associated with a universal integrated circuit card of a user device, such as the at least one configuration parameter received from the unified data repository 112. For example, the encapsulation request may be generated via a command associated with the OTA function services interface 116 for generating an encapsulation request. In an example embodiment, this command may be called Notaf_SecPkt_CommandReq. In some embodiments, the UDM module 110 may provide the encapsulation request to the OTAF module 114.

In response to the provision of the encapsulation request to the OTAF module 114, the UDM module 110 may then receive the secure packet from the OTAF module. For example, the OTAF module may invoke one or more commands associated with the OTA function services interface 116 in order to provide the secure packet to the UDM module 110. In an example embodiment, this command may be called Notaf_SecPkt_CommandResp.

At block 304, the UDM module 110 may transport the secure packet to the user device. In this regard, the UDM module 110 includes means, such as the processing circuitry 22, the communication interface 26 or the like, for transporting the secure packet to the user device. In some embodiments, the secure packet may be transported to the user device 102 via a non-access stratum control plane message.

The UDM module 110 may be configured to provide a notification to the AMF module 108 indicating that one or more configuration parameters are to be provisioned and/or updated at the user device 102. In some embodiments, the notification may comprise the secure packet in order for the AMF 108 to further encapsulate the secure packet, such as by encapsulating the secure packet in a short messages services (SMS) format.

Referring now to FIG. 3B, a method 300 performed by the OTAF module 114 is depicted. As shown in block 311, the OTAF module 114 includes means, such as the processing circuitry 22, the communication interface 26 or the like, for receiving an encapsulation request from a unified data management module. For example, the OTAF module 114 may receive an encapsulation request comprising data for at least one configuration parameter associated with a universal integrated circuit card of a user device from the UDM module 110.

As shown in block 312, the OTAF module 114 includes means, such as the processing circuitry 22, the communication interface 26 or the like, for generating, in response to the encapsulation request, a secure packet comprising the at least one configuration parameter and a secure packet header. The secure packet may be generated by the OTAF module 114 in a number of different ways. For example, as detailed herein, the method by which the secure packet is generated may depend on the architecture and deployment of various elements of the network 100A-C.

For example, in embodiments in which the OTAF module 114 is configured to be a standalone network function comprising an integrated secure packet library 118, such as depicted in FIG. 1A, the secure packet comprising the at least one configuration parameter and the secure packet header may be generated via the secure packet library 118 associated with OTAF module. With regards to instances in which the OTAF module 114 is configured to be a standalone network function comprising an integrated secure packet library 118, FIG. 4A depicts an example of a portion of a 5G wireless network (e.g., network 100A) deployed in accordance with method 310.

In another embodiment, the OTAF module 114 may be collocated with an OTA gateway, such as in the depicted embodiment of FIG. 1B. In this regard, and as described above, the OTAF module 114 may comprise the OTA gateway 120. In instances in which the OTAF module 114 comprises an OTA gateway 120 and the OTA gateway comprises the secure packet library 118, the OTAF 114 may provide an encapsulation request to the OTA gateway 120. In this regard, the OTAF module 114 includes means, such as the processing circuitry 22, the communication interface 26 or the like, for generating and providing an encapsulation request to an OTA gateway. For example, the encapsulation request generated by the OTAF 114 may be based on the encapsulation request received from the UDM module 110. With regards to instances in which the OTAF module 114 may be collocated with an OTA gateway 120, FIG. 4B depicts an example of a portion of a 5G wireless network (e.g., network 100B) deployed in accordance with method 310.

The OTA gateway 120 may then generate the secure packet comprising the at least one configuration parameter and the secure packet header via the secure packet library 118 associated with OTA gateway 120. In this regard, the OTAF module 114 may be configured to receive, from the OTA gateway 120 and in response to the encapsulation request, the secure packet generated by the OTA gateway.

In another embodiment, the OTAF module 114 may be collocated with the UDM module 110, such as in the depicted embodiment of FIG. 1C. In this regard, the OTAF module 114 may comprise the UDM module 110. In instances in which the OTAF module 114 comprises the UDM module 110, the UDM module 110 may utilize the secure packet library 118 of the OTAF module 110 directly. For example, the OTAF module 114 may provide one or more commands of an application programming interface associated with the over-the-air function module (e.g., commands associated with the secure packet library 118) to the unified data management module for generating the secure packet. In instances in which the OTAF module 114 may be collocated with the UDM module 110, FIG. 4C depicts an example of a portion of a 5G wireless network (e.g., network 100C) deployed in accordance with method 310.

Regardless of how the secure packet is generated, at block 313 the OTAF module may provide the secure packet to the UDM module for delivery to the user device. In this regard, the OTAF module 114 includes means, such as the processing circuitry 22, the communication interface 26 or the like, for providing the secure packet to the UDM module for delivery to the user device. In an embodiment, the OTAF module 114 may invoke one or more commands associated with the OTA function services interface 116 and/or the secure packet library 118 in order to provide the secure packet to the UDM module 110 (e.g., Notaf_SecPkt_CommandResp). As described above, the UDM module 110 may transport the secure packet over a fifth-generation system (5GS) core network to the user device.

In some embodiments, the network 100A-C may further comprise a network repository function. The network repository function (NRF) may be associated with a home public land mobile network (HPLMN). The NRF may be accessible by the OTAF function 114, the UDM module 110 and/or other elements associated with the network 100A-C.

In an embodiment, the OTAF module 114 may be configured to register information associated with the OTAF module 114 to the NRF. For example, the OTAF module 114 may provide a function type, instance identifier, and/or data regarding a secure packet service to the NRF in order to register the secure packet service. In an embodiment, the OTAF module 114 may receive, from the NRF, confirmation that the secure packet service has been registered against the instance identifier. FIG. 5A illustrates a signal diagram with respect to OTAF secure packet service registration.

In one embodiment, the NRF may be configured to provide for OTAF secure packet service discovery. FIG. 5B illustrates a signal diagram with respect to OTAF secure packet service discovery. In this regard, UDM module 110 may be configured to discover, via the NRF, an OTAF module comprising a secure packet service. For example, the UDM module 110 may query the NRF in order to locate a secure packet service, such as a secure packet service that has been registered as described above. The NRF may then retrieve and provide information associated with an OTAF module 114 to the UDM module 110, such as service registration information (e.g., a fully qualified domain name (FQDN) or internet protocol (IP) address) and/or instance information (e.g., an OTAF instance identifier). In this regard, the UDM module includes means, such as the processing circuitry 22, the communication interface 26 or the like, for receiving data associated with the discovered OTAF module. The UDM module 110 may then store, such as via memory 24, the received information in order to subscribe to and utilize the OTAF module 114. In one embodiment, the UDM module 110 may receive, from the NRF, confirmation that the secure packet service has been registered against the instance information (e.g., an OTAF_instance_ID). In one embodiment, the NRF may be configured to provide for OTAF secure packet service invocation. FIG. 5C illustrates a signal diagram with respect to OTAF secure packet service invocation.

FIGS. 3A and 3B illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, at a network function module configured to provide secure packet services, an encapsulation request from a unified data management module, the encapsulation request comprising data for at least one configuration parameter associated with a universal integrated circuit card of a user device;
   generating, in response to the encapsulation request, a secure packet comprising the at least one configuration parameter and a secure packet header, wherein the secure packet is generated by (i) a first method in an instance that the network function module is configured to be a standalone network function, and (ii) a second method, different to the first method, in an instance that the network function module is co-located in an over-the-air gateway; and
   providing the secure packet to the unified data management module for delivery to the user device.

2. A method according to claim 1, wherein the secure packet comprising the at least one configuration parameter and the secure packet header is generated via a secure packet library associated with the network function module.

3. A method according to claim 1, wherein the network function module configured to generate a secure packet is co-located in an over-the-air gateway.

4. A method according to claim 1, wherein the unified data management module and the network function module are co-located, and wherein the network function module provides one or more commands of an application programming interface associated with the network function module to the unified data management module for generating the secure packet.

5. A method according to claim 1, further comprising:
   delivering the secure packet to the user device via a non-access stratum control message over a fifth-generation system (5GS) core network.

6. A method according to claim 1, wherein the at least one configuration parameter is associated with steering of roaming information.

7. A method according to claim 1, further comprising:
   registering a network function module function type, network function module instance ID and a secure packet service associated with the network function module configured to provide secure network services to a network repository function; and
   receiving, from the network repository function, confirmation that the secure packet service has been registered against the network function module instance ID.

8. An apparatus comprising:
   at least one processor; and
   at least one memory including computer program code,
   the at least one memory and the computer program code configured to, with the at least one processor, cause the apparatus at least to:
   receive an encapsulation request comprising data for at least one configuration parameter associated with a universal integrated circuit card of a user device;
   generate, in response to the encapsulation request, a secure packet comprising the at least one configuration parameter and a secure packet header, wherein the secure packet is generated by (i) a first method in an instance that the network function module is configured to be a standalone network function, and (ii) a second method, different to the first method, in an instance that the network function module is co-located in an over-the-air gateway; and
   provide the secure packet for delivery to the user device.

9. An apparatus according to claim 8, wherein the secure packet comprising the at least one configuration parameter and the secure packet header is generated via a secure packet library associated with the apparatus.

10. An apparatus according to claim 8, wherein the unified data management module and a network function module configured to provide secure packet services are co-located, and wherein the network function module provides one or more commands of an application programming interface associated with the network function module to the unified data management module for generating the secure packet.

11. An apparatus according to claim 8, wherein the memory including the program code is further configured to, with the processor, cause the apparatus to:
    deliver the secure packet to the user device via a non-access stratum control message over a fifth-generation system (5GS) core network.

12. An apparatus according to claim 8, wherein the at least one configuration parameter is associated with steering of roaming information.

13. An apparatus according to claim 8, wherein the memory including the program code is further configured to, with the processor, cause the apparatus to:
    register a network function module function type, network function module instance ID and a secure packet service associated with the network function module configured to provide secure packet services to a network repository function; and
    receive, from the network repository function, confirmation that the secure packet service has been registered against the network function module instance ID.

14. A method comprising:
receiving, at a unified data management module, a configuration parameter notification from a unified data repository;
generating, in response to the configuration parameter notification, a request to retrieve at least one configuration parameter from the unified data repository;
generating, via a secure packet service associated with an over-the-air function module, a secure packet comprising the at least one configuration parameter; and
transporting, via a non-access stratum control plane message, the secure packet to the user device.

15. The method according to claim 14, wherein the configuration parameter notification comprises data associated with at least one configuration parameter associated with a universal integrated circuit card of a user device.

16. A method according to claim 15, wherein the at least one configuration parameter is associated with a routing identifier.

17. A method according to claim 15, wherein the at least one configuration parameter is associated with steering of roaming information.

18. A method according to claim 14, further comprising:
discovering, via a network repository function and at a unified data management module, a network function module comprising the secure packet service; and
receiving, in response to the discovery, data associated with the network function module.

19. A method according to claim 18, wherein the received data associated with the network function module comprises a network function_instance_ID and a fully qualified domain name (FQDN) or internet protocol (IP) address.

20. A method according to claim 19, further comprising:
receiving, from the network repository function, confirmation that the secure packet service has been registered against the network function_instance_ID.

* * * * *